United States Patent [19]

Huygens

[11] Patent Number: 5,399,594
[45] Date of Patent: Mar. 21, 1995

[54] PROCESS FOR MAKING MDI BASED FLEXIBLE FOAM

[75] Inventor: Eric Huygens, Heverlee, Belgium

[73] Assignee: Imperial Chemical Industries PLC, London, England

[21] Appl. No.: 79,118

[22] Filed: Jun. 17, 1993

[30] Foreign Application Priority Data

Jul. 7, 1992 [GB] United Kingdom ............... 9214372

[51] Int. Cl.$^6$ ............................................. C08G 18/08
[52] U.S. Cl. ................................ 521/172; 521/155; 264/53; 425/812
[58] Field of Search ............... 521/172, 155; 264/53; 425/812

[56] References Cited

U.S. PATENT DOCUMENTS

| | | |
|---|---|---|
| 3,182,104 | 5/1965 | Cwik ..................... 264/45 |
| 3,488,300 | 1/1970 | Burkholder et al. ........... 521/172 |
| 3,632,707 | 1/1972 | Rice ..................... 264/54 |
| 4,314,034 | 2/1982 | Fulmer et al. ............ 521/65 |
| 4,777,186 | 10/1988 | Stang et al. ............. 521/50 |
| 4,833,176 | 5/1989 | Wolf et al. ............. 521/160 |

FOREIGN PATENT DOCUMENTS 1304083 10/1983 Australia .
0370750 5/1990 European Pat. Off. .

OTHER PUBLICATIONS

V. Woods, ICI Polyurethanes Book 1990, pp. 71–84.

*Primary Examiner*—Morton Foelak

[57] ABSTRACT

Process for preparing MDI flexible foam in a closed mould at a pressure of 0.001–0.5 bar above atmospheric pressure.

6 Claims, No Drawings

PROCESS FOR MAKING MDI BASED FLEXIBLE FOAM

The present invention is concerned with a process for preparing cold cure moulded flexible polyurethane foam based on polymethylene polyphenylene polyisocyanate.

Moulded flexible polyurethane foam conventionally can be made in two ways: according to the cold cure process or according to the hot cure process.

Hot cured flexible foam is made by the reaction of TDI with polyols. External heat is applied to the mould after filling in order to obtain sufficient surface cure of the foam moulding to allow its early release from the mould. The mould used for preparing the hot cured flexible foams comprises a lid having a plurality of relatively large vent holes; as a result thereof the pressure built-up during the preparation of the foam is limited and in general will not exceed 0.5 bar above atmospheric pressure. The TDI and polyols applied are used with a certain, limited degree of overpacking, i.e. the amount of foam reaction mixture used compared with the minimum amount required to just fill the mould under the given operating conditions $$\left( \text{overpack} = \frac{\text{moulded density} - \text{free rise density}}{\text{free rise density}} \times 100 \right).$$

Cold cure flexible foams are made from MDI (diphenylmethane diisocyanate) compositions, TDI, mixtures of polymeric MDI and TDI (toluene diisocyanate), and modified TDI. Due to greater reactivity the reaction may be allowed to take place at room temperature or only slightly above room temperature; no external heat is required to allow early release from the mould. The moulds used to prepare cold cure flexible foams contain a small number of very small vent holes. In order to prepare a good quality flexible foam it is necessary to apply a considerable degree of overpacking, in general at least 30% and often more than 50%. As a result the pressure built-up in the mould is considerable, in general well above 0.5 bar above atmospheric pressure, so that a considerable amount of external mould clamp force is required.

For more details regarding hot and cold cure systems we refer to the ICI Polyurethanes Book of 1990 by G. Woods, pages 71–84.

Surprisingly we have found that MDI based flexible foams may be made in moulds which conventionally have been used for preparing hot-cure foams which moulds only need a reduced clamp force. This is the more surprising since it was believed that MDI based flexible foams made in such moulds would not be of a good quality: because of the reaction profile of MDI-based reaction systems it was believed that the foam would comprise surface voids due to decompression if a mould with a vented lid without external clamp force was used. Surprisingly this was not the case.

Accordingly the present invention is concerned with a process for preparing a flexible polyurethane foam by reacting a polyisocyanate composition comprising polymethylene polyphenylene polyisocyanate and an isocyanate-reactive composition comprising at least one isocyanate-reactive compound comprising at least two isocyanate-reactive hydrogen atoms and using a blowing agent characterised in that the foaming is conducted in a closed mould at a pressure of at least 0.001 to at most 0.5 bar above atmospheric pressure.

The process according to the present invention has the following advantages
- the foam obtained has a lower density than a similar foam prepared in a mould conventionally used for preparing cold cure flexible foams;
- since the pressure in the mould is lower than in the conventional process for preparing cold cure flexible foams the requirements for the mould are less demanding (the clamp force required is very much reduced);
- less overpack is required than in the conventional process for preparing cold cure flexible foams and hence less material is required to prepared a good quality foam;
- although moulds are used which conventionally were used for making hot cure TDI-based flexible foams no such hot cure after treatment is required;
- soft, good quality, all MDI based, fully water blown, flexible foams may be obtained;
- open-celled foams may be obtained which hardly need crushing;
- demoulding time is similar to conventional cold cure foams;
- due to the reduced pressure no sophisticated processing/temperature control, as it is necessary in cold cure moulding, is required.

The process according to the invention is conducted in such a way that the pressure in the mould during the foam-forming process does not exceed 0.5 bar above atmospheric pressure and preferably the pressure is between 0.005 and 0.3 and more preferably between 0.01 and 0.2 bar above atmospheric pressure. This is achieved by providing the top lid of the mould with a plurality of vent holes, preferably at least 10 most preferably 15–80, which vent holes generally have a diameter of 0.5–7 and preferably 1–5 mm. The vent holes in the lid are located at those places where pressure-built up is expected. In principle any mould may be used provided it is properly provided with vent holes. In particular moulds which were or are conventionally used for making hot cure TDI-based flexible foams, especially those used for making flexible foams for automotive seating.

The process is conducted at an amount of overpack of 0.1–40%, preferably of 1–25% by weight.

The other process conditions are conventional for preparing MDI flexible foams in a mould: the temperature of the isocyanate reactive composition and the polyisocyanate as fed into the mould may vary between room temperature and 80° C., the mould temperature may vary between room temperature and 80° C. The residence time; i.e. the time between the feeding of the reaction system into the mould and the demoulding of the flexible foam in general is less than 10 minutes although the foam may be kept in the mould for a longer period of time. The foams obtained may vary in density between wide ranges. Preferred densities are 20–40 and more preferably 22–35 kg/m$^3$.

The foams do not need to be subjected to a post cure treatment at elevated temperature: the foams obtained are cold cure flexible foams.

The moulding process applied may be any conventional moulding process provided the pressure restriction as outlined above is applied; open-pour and injection (reaction injection) techniques may be used. The devices used for applying these moulding techniques are conventional.

The flexible foams may be prepared according to the one-shot process or the prepolymer process which may be a quasi-prepolymer process or a prepolymer process. The last process is preferred.

The polyisocyanate and the isocyanate-reactive composition are reacted in a closed mould using a blowing agent. Any conventional blowing agent may be used; water is the most preferred one (water reacts with isocyanate liberating $CO_2$ which acts as the actual blowing agent; in the present context water is regarded as blowing agent). Further water is also regarded as an isocyanate-reactive compound comprising at least two isocyanate-reactive groups in the present context. So, in case a prepolymer process is applied the only reactive ingredients fed into the mould could be an isocyanate-terminated prepolymer and water.

The expression "polyurethane foam" as used herein generally refers to cellular products as obtained by reacting polyisocyanates with isocyanate-reactive hydrogen containing compounds, in the presence of foaming agents, and in particular includes cellular products obtained with water as reactive foaming agent (involving a reaction of water with isocyanate groups yielding urea linkages and carbon dioxide).

The expressions "isocyanate-reactive hydrogen containing compounds" or "isocyanate-reactive compounds" as used herein are furthermore intended to include polyols as well as polyamines.

The expression "polyurethane foam" is thus intended also to include products which comprise urethane linkages together with urea linkages and even products which essentially comprise urea linkages with few or no urethane linkages.

The expression "flexible polyurethane foam" as used herein refers to cellular products which exhibit substantial shape recovery after deformation.

The expressions "polymethylene polyphenylene polyisocyanates" and "MDI" as used herein refers to polyisocyanates selected from diphenylmethane diisocyanate isomers, polyphenyl polymethylene polyisocyanates and derivatives thereof bearing at least two isocyanate groups and containing carbodiimide groups, uretonimine groups, isocyanurate groups, urethane groups, allophanate groups, urea groups or biuret groups. They are obtainable by condensing aniline with formaldehyde, followed by phosgenation, which process yields what is called crude MDI, by fractionation of said crude MDI, which process yields pure MDI and polymeric MDI, and by autocondensation of crude, pure or polymeric MDI, or reaction of excess of crude, pure or polymeric MDI with polyols or polyamines, which processes yield modified MDI, containing carbodiimide, uretonimine, isocyanurate, urethane, allophanate, urea or biuret groups.

Further polyisocyanates encompassed are isocyanate bearing compounds sometimes referred to in the art as quasi-prepolymers or semi-prepolymers and prepolymers based on MDI. The expression "additives conventional in the art" as used herein refers to such optional or desirable ingredients as known in the art of flexible polyurethane foams, as more in particular reported in chapter 2 of the ICI Polyurethanes Handbook by G. Woods.

Thus the expression additives conventional in the art is in particular intended to include catalysts, chain-extending agents, cross-linking agents, curing agents, blowing agents, surfactants, fillers, fibrous reinforcements and flame retardants. The expressions "isocyanate index" and "NCO-index" as used herein refer to the ratio of —NCO groups over the NCO-reactive hydrogen atoms present in a polyurethane formulation, given as a percentage:

$$NCO\text{-index} = \frac{[NCO]}{[\text{active hydrogen}]} \times 100.$$

In other words the NCO-index expresses the percentage of isocyanate actually used in a formulation with respect to the amount of isocyanate reactive hydrogen used in a formulation.

The expression "active hydrogen atoms" as used herein for the purpose of calculating the isocyanate index refers to the total of hydroxyl and amine hydrogen atoms present in the reactive compositions in the form of polyols, polyamines and/or water; this means that for the purpose of calculating the isocyanate index one water molecule is considered to comprise two active hydrogens.

It should be observed that the isocyanate index as used herein is considered from the point of view of the actual foaming process involving the MDI ingredient, the polyol and/or polyamine ingredient and the water. Any isocyanate groups consumed in a preliminary step to produce modified MDI (including such MDI-derivatives referred to in the art as quasi- or semi-prepolymers and prepolymers) or any active hydrogens reacted with isocyanate to produce modified polyols or polyamines, are not taken into account in the calculation of the isocyanate index. Only the free isocyanate groups and the free active hydrogens (including those of the water) present at the actual foaming process are taken into account. The index in the process according to the present invention may range from 25–105 and preferably ranges from 40–80.

The expression "one shot" method, process or system as used herein therefore refers to such processes where the MDI ingredient, the polyol and polyamine ingredient and the water are reacted with each other, while in the so called prepolymer method MDI ingredients are pre-reacted with part (semi- or quasi-prepolymer) or all (prepolymer) of the polyol and polyamine ingredients. The expressions "foam density" and "density" as used herein when referring to flexible polyurethane foams, relate, for the purpose of clear definition, to the density as would be measured on a foam sample obtained by moulding according to ISO 845 (core density).

MDI which can be employed in accordance with the invention include for example:

(a) diphenylmethane-4,4'-diisocyanate and mixtures thereof with other isomers of diphenylmethane diisocyanate;

(b) methylene bridged polyphenylpolyisocyanates prepared by phosgenation of mixtures of polyamines obtained by the condensation of aniline and formaldehyde and known in the art as "crude" or "polymeric MDI";

(c) polymers and oligomers obtained by reacting diphenylmethane diisocyanates or "crude MDI" with an isocyanate-reactive compound, such as for example a monomeric glycol or polyol (or mixtures thereof) or a hydroxyl-ended polyester or polyether; such polymers and oligomers known in the art as "MDI prepolymers"; and (d) modified diphenylmethane diisocyanates or "crude MDI" in which a proportion of the isocyanate groups are converted into other functional groups such as carbodiimide, isocyanurate, uretonimine or allophanate groups, or in which a proportion of the isocyanate groups are reacted with an isocyanate-reactive compound.

The NCO-functionality of the used MDI preferably ranges from 1.9 to 2.9 and more preferably from 2 to 2.5 and most preferably from 2 to 2.3.

The MDI may contain up to 25% of its weight of another polyisocyanate of the types mentioned below. In calculating the content of these other polyisocyanates in quasi-prepolymers and prepolymers the weight of the isocyanate-reactive compounds used in preparing the prepolymer is not taken into account.

The process according to the present invention is particularly related to the use of a prepolymer.

Diphenylmethane diisocyanate compositions which may be used in the preparation of the prepolymer include unmodified diphenylmethane diisocyanates preferably containing at least 60% by weight of the 4,4'-isomer. Suitable isocyanates include isomer mixtures containing at least 2% but not more than 40%, preferably not more than 30%, and more preferably not more than 20% by weight of the 2,4' isomer and not more than 5% by weight of the 2,2'-isomer. Other suitable diphenylmethane diisocyanate compositions include modified forms of these diphenylmethane diisocyanates, that is to say MDI modified in known manner by the introduction of urethane, allophanate, urea, biuret, carbodiimide, uretonimine or isocyanurate residues. These so-called MDI variants particularly include uretonimine-modified MDI having NCO contents of at least 25% by weight and polyether-based prepolymers having NCO contents of at least 20% by weight.

Diphenylmethane diisocyanate compositions containing MDI and polymeric fillers may also be used in the preparation of the prepolymer. Such products include polyurea dispersions in MDI such as have been described, for example, in EP-A-0 103 996.

Other compositions containing polymeric fillers include prepolymers based on MDI and the above mentioned "polymer" polyols containing dispersed polymer particles. In these products, it is generally preferred that the dispersed polymer particles have an average particle size of less than 50 microns.

Further diphenylmethane diisocyanate compositions which may be used in the preparation of the prepolymers include compositions containing polymethylene polyphenylene polyisocyanates. Thus, mixtures may be used containing at least 50% by weight of pure MDI and up to 50% by weight of the so-called polymeric MDI containing from 35 to 65% by weight of diisocyanates, the remainder being largely polymethylene polyphenylene polyisocyanates having isocyanate functionalities greater than 2. Mixtures may also be used of pure MDI and polymeric MDI compositions containing higher proportions (up to 100%) of the said higher functionality polyisocyanates.

Still further diphenylmethane diisocyanate compositions which may be used in preparing the prepolymer include mixtures of the above described MDI types and up to 25% by weight of another polyisocyanate or mixture of polyisocyanates. Other polyisocyanates which may be used in admixture with the MDI include aliphatic, cycloaliphatic and araliphatic polyisocyanates, especially diisocyanates, for example hexamethylene diisocyanate, isophorone diisocyanate, cyclohexane-1,4-diisocyanate, 4,4'-dicyclohexylmethane diisocyanate and m- and p-tetramethylxylene diisocyanate and, especially, other aromatic polyisocyanates such as tolylene diisocyanates and phenylene diisocyanates. Preferably only MDI-based polyisocyanates are used.

Isocyanate reactive hydrogen containing compounds for use in accordance with the invention are selected from polyols and polyamines with an average nominal functionality of 2-6, preferably 2-3, and a number average equivalent weight ranging from 750-5000, preferably from 1000 to 3000.

Suitable polyols which can be employed include for example those polyether and polyester polyols which have an average nominal hydroxyl functionality from 2 to 6, and preferably from 2 to 3, and a number average hydroxyl equivalent weight of from 750 to 5000 preferably from 1000 to 3000 and most preferably from 1000 to 2500.

Further polyols which may be employed include for example polythioethers, polyacetals, polycarbonates and polyesteramides comprising from 2 to 6, and preferably from 2 to 3 hydroxyl groups.

Suitable polyamines which can be employed include for example those polyether polyamines which have an average nominal amine functionality from 2 to 6, and preferably from 2 to 3, and a number average equivalent weight from 750 to 5000, preferably from 1000 to 3000 and most preferably from 1000 to 2500.

Suitable polyether polyols which can be employed include those which are prepared by reacting one or more alkylene oxides or substituted alkylene oxides with one or more active hydrogen containing initiator compounds. Such oxides include for example ethylene oxide, propylene oxide, tetrahydrofuran, butylene oxides, styrene oxide, epichlorhydrin and epibromhydrin.

Suitable initiator compounds include, for example, water, ethylene glycol, propylene glycol, butane diol, hexane diol, glycerol, trimethylol propane, pentaerythritol, hexanetriol, hydroquinone, resorcinol, catechol, bisphenols, novolac resins and phosphoric acid.

Further suitable initiators include, for example, ammonia, ethylenediamine, diaminopropanes, diaminobutanes, diaminopentanes, diaminohexanes, ethanolamine, aminoethylethanolamine, aniline, 2,4-toluenediamine, 2,6-toluenediamine, 2,4'-diaminodiphenylmethane, 4,4'-diaminodiphenylmethane, 1,3-phenylenediamine, 1,4-phenylenediamine, naphthylene-1,5-diamine, 4,4'-di(-methylamino)-diphenylmethane, 1-methyl-2-methylamino-4-aminobenzene, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene and 3,5,3',5'-tetraethyl-4,4'-diaminodiphenylmethane Suitable polyester polyols which can be employed include, for example, those prepared by reacting one or more polycarboxylic acids or anhydrides or esters thereof with one or more polyhydric alcohols. The polycarboxylic acids may be aliphatic, cycloaliphatic, aromatic and/or heterocyclic and may be substituted (e.g. with halogen) and/or unsaturated. Examples of carboxylic acids of this kind include glutaric acid, succinic acid, adipic acid, suberic acid, azelaic acid, sebacic acid, phthalic acid, isophthalic acid, trimellitic acid, tetrahydrophthalic acid, hexahydrophthalic acid, tetrachlorophthalic acid, maleic acid, fumaric acid, dimeric and trimeric fatty acids, which may be in admixture with monomeric fatty acids, terephthalic acid, and the like. Examples of suitable polyhydric alcohols include ethylene glycol; 1,2-propylene glycol; 1,3-propylene glycol, butylene glycols; 1,6-hexane diol; 1,8-octane diol; neopentyl glycol; cyclohexane dimethanol (1,4-bis-hydroxymethyl cyclohexane); 2-methyl-1,3-propane diol; glycerol; trimethylol propane; 1,2,6-hexane triol; 1,2,4-butane triol; trimethylol ethane; pentaerythritol; quinitol; diethylene glycol; triethylene glycol; tetraethylene glycol; polyethylene glycol; dipropylene glycol; polypropylene glycols; dibutylene glycol; or polybutylene glycols. It is also possible to use polyesters of lactones such as caprolactone, or hydroxy carboxylic acids such as hydroxy caproic acid.

Suitable polyether polyamines which can be employed include those which are prepared by amination of polyether polyols of the type described above.

For use in accordance with the invention it is not necessary that the amination of the polyols be complete. Partially aminated polyether polyols of the type disclosed above can also be employed.

Other suitable polyol compositions which can be used include for example polyhydroxyl derivatives which contain high molecular polyaddition or polycondensation polymers in dispersed or soluble state. Such polyhydroxyl derivatives can for example be obtained by carrying out a polyaddition reaction (for instance between polyisocyanates and amino-functional compounds) or a polycondensation reaction (for instance between polyisocanates and amino-functional compounds) or a polycondensation reaction (for instance between formaldehyde and phenols and/or amines) in situ in such polyols as already disclosed above. Suitable are also polyhydroxyl derivatives modified by vinylpolymerisation, such as for example obtained by polymerising styrene and acrylonitrile in the presence of polyether polyols or polycarbonate polyols.

As stated above the process according to the invention may be carried out according to the semi-prepolymer or prepolymer technique. In order to prepare such a prepolymer the polyisocyanate and a part or all of the polyol is pre-reacted, i.e. outside the mould and before the foaming takes place, under conditions known per se. Reaction temperatures of about 40° C. to about 90° C. are generally suitable for the preparation of urethane group-containing prepolymers from polyols or urea group-containing prepolymers from polyamines but, if desired, the reaction may be continued under known conditions so as to convert urethane groups to allophanate groups and urea groups to biuret groups. To achieve a final NCO content within the specified range, an initial ratio of isocyanate to isocyanate-reactive groups (for example NCO/OH) would typically be within the range from 3:1 to 20:1 . Preferred prepolymers are made by reacting the starting materials at initial ratio of isocyanate to isocyanate-reactive groups in the range from 3.5:1 to 15:1,especially 4:1 to 10:1,to give prepolymers having NCO contents of 2 to 15% by weight.

A preferred polyisocyanate used in the process according to the present invention is a liquid isocyanate-containing prepolymer composition having an average isocyanate functionality of 2 or more and an NCO content of from 2 to 15% by weight as obtainable by reacting an isocyanate-reactive polymer having an average nominal functionality of from 2 to 6,preferably from 2 to 4, and a number average equivalent weight of from 750 to 5000 with a stoichiometric excess of an MDI composition having an average isocyanate functionality in the range from 2 to 2.3.

This prepolymer is reacted with a compound or a composition comprising such a compound comprising at least two isocyanate-reactive hydrogens. Although such a composition may contain a low amount of an isocyanate-reactive compound having an average nominal functionality of 2-6 and a number average equivalent weight of 750-5000, the amount being less than 25% by weight of the isocyanate-reactive composition, such a high molecular weight isocyanate-reactive compound preferably is only present in very minor amounts (less than 5% by weight of the isocyanate-reactive composition) or absent. Preferably the isocyanate-reactive composition comprises at least 40% by weight of water and preferably at least 90% by weight, the remainder of the isocyanate-reactive ingredients being selected from chain extenders having 2-6 isocyanate-reactive groups and having a molecular weight of 60-500, like ethylene glycol, diethylene glycol, propylene glycol, dipropylene glycol, glycerol, 1,4-butane diol, diethylene diamine, ethanolamine, diethanolamine, triethanolamine, toluene diamine, diaminodiphenylmethane, diethyltoluene diamine (DETDA), isophorone diamine and diamino polyols like Mannich derivatives of alkyl phenols or phenols.

The amount of the isocyanate-reactive composition is 1–20 and preferably 1–10 parts by weight per 100 parts by weight of the polyisocyanate composition used.

Further it is preferred when flexible foams are made according to the present invention from the above prepolymer having an NCO value of 2–15% by weight and the above isocyanate-reactive composition comprising at least 40% by weight of water to use an additional polyisocyanate composition having an NCO content of at least 20% by weight, preferably at least 25% by weight as disclosed in European Patent Application 442631. These polyisocyanates may be selected from those mentioned before provided they have the indicated NCO value.

Preferred polyisocyanate compositions for use in conjunction with the isocyanate terminated prepolymer are tolylene diisocyanates, methylene bridged polyphenyl polyisocyanates and diphenylmethane diisocyanates. Particularly preferred diphenylmethane diisocyanates include the various types of diphenylmethane diisocyanate compositions described above in relation to the preparation of the prepolymer provided they are liquids at the operating temperature. Thus, suitable compositions include MDI isomer mixtures, preferably containing at least 60% by weight of the 4,4'-isomer, MDI variants and crude or polymeric MDI. It is preferred that the prepolymer is used in conjunction with at least one diphenylmethane diisocyanate composition having an NCO content of at least 25% by weight.

Preferred tolylene diisocyanate compositions for use in this embodiment of the invention are the so-called TDI 80/20 (a 80:20 mixture of 2,4-tolylene diisocyanate and 2,6-tolylene diisocyanate), TDI 65/35 (a 65:35 mixture of 2,4-tolylenediisocyanate and 2,6-tolylenediisocyanate), and high-NCO prepolymer thereof.

The weight ratio of the low-NCO prepolymer and the high NCO polyisocyanate is preferably 1.0–20:1. The low-NCO prepolymer and the high-NCO polyisocyanate preferably are combined and mixed shortly before the polyisocyanates are contacted with the isocyanate-reactive composition. The total amount of polyisocyanates other than MDI in the two polyisocyanate compositions is at most 25% by weight of the weight of MDI present. In calculating the content of these other polyisocyanates the weight of the isocyanate-reactive compounds used in preparing the prepolymer is not taken into account.

The flexible foams prepared according to the present invention are low density, MDI-based flexible foams of good quality which may be used in e.g. cushioning like in furniture and automotive seating; the beneficial effect of the present invention is in particular obtained in complicated moulds like those used in the preparation of flexible foam cushions for automotive seats.

The invention is illustrated by the following examples.

EXAMPLE 1

80 parts by weight (pbw) of prepolymer [1] at a temperature of 50° C., 20 pbw of polymeric MDI [2] at a temperature of 34° C., 4.7 pbw of water at a temperature of 73° C. and 1.84 pbw of a catalyst package [3] at a temperature of 48° C. were metered from separate containers via a mixing head (Krauss Maffei MK 12/18 UL 4K) into a mould conventionally used for making hot cured foams (Renault seat mould 7700797 292). The mould was closed and the reaction mixture allowed to react. The mould temperature was 60° C.; the isocyanate index was 50; the total amount of material metered into the mould was 1100 g (at 450 g/sec); the overpack was 35% by weight; the time between filling the mould and demoulding was 5 minutes; the pressure in the mould during the reaction was between 0.001 and 0.5 bar above atmospheric pressure. A good quality moulded flexible foam was obtained which was very soft, had a good surface quality (no voids or surface defects) and a core density of 29.7 kg/m$^3$.

1) prepolymer having an NCO value of 6.5% by weight from MDI (10% 2,4') and a trifunctional PO-polyol having an OH value of 36 and 14% EO tip.
2) polymeric MDI having an NCO value of 30.7.
3) the catalyst package contained 5.26 pbw Niax A1 (catalyst from Union Carbide); 21.05 pbw of DABCO 33LV (catalyst from Air Products); 15.79 pbw of Tegostab B 4113 (surfactant from Goldschmidt) and 57.90 pbw of Arcol 2580 (a trifunctional polyol of 6000 MW from Arco).

EXAMPLE 2

85 pbw of the above prepolymer (at 47° C.); 15 pbw of the above polymeric MDI (at 33° C.) and 5.29 pbw of a water/catalyst package [4] (at 47° C.) were metered from separate containers via the above mixing head into the above mould. The mould was closed and the reaction mixture allowed to react. The mould temperature was 60° C.; the isocyanate index was 57; the total amount of material metered into the mould was 1200 g (320 g/sec); the overpack was 10% by weight; the time between filling the mould and demoulding was 5 minutes; the pressure in the mould was between 0.001 and 0.5 bar above atmospheric pressure. A good quality moulded flexible foam was obtained which was very soft, had a good surface quality (no voids or surface defects) and a core density of 31.2 kg/m$^3$.

4) The water/catalyst package contained 71.02 pbw of water, 0.83 pbw of Niax A1, 8.28 pbw of DABCO 33 LV, 16.56 pbw of Tegostab B 4113 and 3.31 pbw of Cp 1421 (a trifunctional polyol having a 5000 MW from DOW).

EXAMPLE 3 (comparative)

Example 2 was repeated but instead of the mould used in example 2 a conventional mould for preparing cold cure MDI-based flexible foams was employed (General Motors seat back mould (APV Van)). At an overpack of 10, 20 and 40% by weight the mould could not be filled. At an overpack of 60% by weight (pressure more than 1 bar above atmospheric pressure) a flexible foam was obtained having a core density of 45.2 kg/m$^3$.

I claim:

1. Process for preparing a flexible polyurethane foam by reacting a polyisocyanate composition comprising polymethylene polyphenylene polyisocyanate and an isocyanate-reactive composition comprising at least one isocyanate-reactive compound comprising at least two isocyanate-reactive hydrogen atoms and using a blowing agent characterized in that the foaming is conducted in a closed, vented mould at a pressure of at least 0.001 to at most 0.5 bar above atmospheric pressure, wherein the process is conducted at an amount of overpack of 0.1 to 40% by weight.

2. Process according to claim 1 characterised in that the pressure is 0.01–0.2 bar above atmospheric pressure.

3. Process according to claim 1 characterised in that the polyisocyanate comprises a liquid isocyanate-containing prepolymer composition having an average isocyanate functionality of 2 or more and an NCO content of from 2 to 15% by weight as obtainable by reacting an isocyanate-reactive polymer having an average nominal functionality of from 2 to 6 and a number average equivalent weight of from 750 to 5000 with a stoichiometric excess of a polymethylene polyphenylene polyisocyanate composition having an average isocyanate functionality in the range from 2 to 2.3.

4. Process according to claim 1 characterised in that the polyisocyanate composition essentially consists of polymethylene polyphenylene polyisocyanates; that at least 40% by weight of the isocyanate-reactive composition is water; that water is used as the only blowing agent and that the reaction is conducted at an isocyanate index of 40–80.

5. Process according to claim 1 characterised in that the process is conducted at an amount of overpack of 1–25% by weight.

6. Process according to claim 1 characterised in that the polyisocyanate comprises a liquid isocyanate-containing prepolymer composition having an average isocyanate functionality of 2 or more and an NCO content of from 2 to 15% by weight as obtainable by reacting an isocyanate-reactive polymer having an average nominal functionality of from 2 to 6 and a number average equivalent weight of from 750 to 5000 with a stoichiometric excess of a polymethylene polyphenylene polyisocyanate composition having an average isocyanate functionality in the range from 2 to 2.3 and that the polyisocyanate composition consists essentially of polymethylene polyphenylene polyisocyanates; that at least 40% by weight of the isocyanate-reactive composition is water; that water is used as the only blowing agent and that the reaction is conducted at an isocyanate index of 40–80 and that the process is conducted at an amount of overpack of 1–25% by weight.

* * * * *